United States Patent [19]

Albert-Garcia

[11] Patent Number: 5,428,448
[45] Date of Patent: Jun. 27, 1995

[54] METHOD AND APPARATUS FOR NON-CONTACT DIGITAZATION OF FRAMES AND LENSES

[75] Inventor: Pablo Albert-Garcia, Ensenada, Mexico

[73] Assignee: Augen Wecken Plasticos S.R.L. de C.V., Chula Vista, Calif.

[21] Appl. No.: 139,936

[22] Filed: Oct. 20, 1993

[51] Int. Cl.⁶ ............................................. G01B 11/24
[52] U.S. Cl. .................................... 356/376; 356/375; 33/200
[58] Field of Search ............... 356/372, 375, 376, 394, 356/377, 124, 125, 126, 127, 239; 348/94, 125; 33/200, 28, 507; 351/204, 211

[56] References Cited

U.S. PATENT DOCUMENTS

| | | | |
|---|---|---|---|
| 4,524,419 | 6/1985 | Headlund et al. | 356/127 |
| 4,575,751 | 3/1986 | Duschl | 356/394 |
| 4,737,918 | 4/1988 | Langlois et al. | 364/474 |
| 4,798,459 | 1/1989 | Joncour | 356/127 |
| 4,817,024 | 3/1989 | Saigoh | 33/200 |
| 5,131,753 | 7/1992 | Pine et al. | 356/376 |
| 5,307,150 | 4/1994 | Lecerf et al. | 356/376 |

FOREIGN PATENT DOCUMENTS

2188182  1/1974  France ................ 356/127

*Primary Examiner*—Hoa Q. Pham
*Attorney, Agent, or Firm*—Spensley Horn Jubas & Lubitz

[57] ABSTRACT

A method and apparatus for determining the size and shape to which a finished lens used to make an eyeglass lens is to be cut. Coordinates which define the outer perimeter of a lens are determined by illuminating either an eyeglass frame or a lens. An image of the shadow of the frame or lens is captured by an imaging device. A first linear polarizing filter is positioned optically between a light source and the membrane. A second linear polarizing filter, oriented at 180° from the first filter, is placed optically between the membrane and the camera. Thus, the first and second polarizing filters allow a high definition image to be attained for substantially transparent plastic. A general purpose computer: (1) identifies the edges of the image so as to define the perimeter; (2) orients the image by identifying an orientation line placed upon a lens, if the image is of a lens which is not within a frame; and (3) measures the distance between lenses if an eyeglass frame is being measured. If an eyeglass frame is being measured, then a depth gauge indicator is used to measure the depth of a groove in the frame into which a lens is recessed when mounted in the eyeglass frame. Once the coordinates of the lens are determined, they may be verified by comparison with the frames or lens from which they were derived. Further, the coordinates of the outer perimeter of the edged lens may be determined to verify the accuracy of the operation.

25 Claims, 10 Drawing Sheets

FIG. 7

| X ( i-1, j+1 ) | X ( i, j+1 ) | X ( i+1, j+1 ) |
|---|---|---|
| X ( i-1, j ) | X ( i, j ) | X ( i+1, j ) |
| X ( i-1, j-1 ) | X ( i, j-1 ) | X ( i+1, j-1 ) |

METHOD AND APPARATUS FOR NON-CONTACT DIGITAZATION OF FRAMES AND LENSES

BACKGROUND OF THE INVENTION

1. Reid of the Invention

This invention relates to a method and apparatus for measuring eyeglass frames and lenses, and more particularly, to a method and apparatus for digitizing the coordinates of the outer edge of an eyeglass lens or the inner edge of an eyeglass frame by digitizing an image of a shadow of the lens or frame.

2. Description of Related Art

In the past, it was common for lenses used in eyeglasses to be ground by an optician. Grinding eyeglass lenses by hand is precise work that requires considerable skill and time. Grinding eyeglass lenses was commonly done by a limited number of specialists to whom a prescription would be sent. Additionally, the person grinding the lenses would need to be sent the associated eyeglass frame so that the lenses could be shaped to fit the frame.

More recently, it has become popular to stock standard lenses (referred to as "finished lenses") which are ground, cast, or otherwise made to conform to different prescriptions in quantity by a manufacturer. Such finished lenses may be polished, if necessary, and then distributed to optical outlets in order to reduce the time required to fill an eyeglass prescription, and to allow such prescriptions to be filled by people with less skill than is required to grind a lens to a prescribed curvature. By stocking finished lenses which are preground to most prescriptions at optical outlets which are conveniently located, the time required to fill an optical prescription is greatly reduced. Furthermore, since finished lenses can be manufactured in very large quantities, the cost of manufacture is also greatly reduced.

However, due to the large diversity in types and shapes of eyeglass frames, once a pair of finished lenses have been chosen, each finished lens must still be custom cut to fit within an eyeglass frame. No standards have been established in the eyeglass industry to control the shapes and sizes of lenses. Therefore, finished lenses are commonly fit to a frame by a process known as "edging". Initially, edging was performed by hand by skilled artisans. More recently, it has been common for a device known as an "edger" to be used. For example, one prior art method uses a tool which makes contact with, and mechanically traces the shape of, an eyeglass frame into which finished lenses are to be placed. The eyeglass frame is thus used to generate a template which can then be used to guide an edger. As the shape of the template is mechanically traced, a cutting arm is guided to cut the finished lens to fit within the eyeglass frame.

Alternatively, a prior art digitizer may be used to identify the shape and size of a lens and communicate digital data representative of the size and shape to which a lens must be edged to fit within a particular eyeglass frame. Such prior art digitizers make contact with the eyeglass frame and follow the contour of the frame to determine the size and shape of a lens that will fit within the frame.

The process is somewhat different when edging lenses for "frameless glasses", which do not have a complete enclosed frame which can be used to generate a template. In this case, an appropriate "dummy" lens is selected from a set of standard lens shapes and sizes and is used as the template. The edger mechanically traces the outside of the dummy lens, thus using the dummy lens as the template.

While the process of edging a finished lens using an edger is much more accurate and less difficult than manually edging a finished lens, the accuracy of the prior art edgers is such that finished lenses are not always edged properly. This is due in large part to the fact that each of the prior art methods rely upon mechanical contact with an eyeglass frame to determine the size and shape to which a finished lens is to be edged.

The present invention is a non-contact method and apparatus for determining the shape to which a finished lens should be cut in order to fit the finished lens within an eyeglass frame without the use of a template and with a relatively low level of user training and skill.

SUMMARY OF THE INVENTION

The present invention is a method and apparatus for determining the shape to which a finished lens used to make an eyeglass lens is to be cut. In accordance with the present invention, coordinates which define the outer perimeter of a lens are determined by illuminating either an eyeglass frame into which the lens is to be fitted, or a lens (such as a "dummy" lens which is provided by the manufacturer of some eyeglass frames). Illuminating the frame or lens causes a shadow to be cast upon a shadow generation surface, preferably a translucent membrane.

In the preferred embodiment of the present invention, the eyeglass frame or lens is placed in contact with the membrane. In the preferred embodiment, a barrier is present at one edge of the membrane (preferably the edge closest to the operator). By ensuring that the outer edge of each lens socket of the eyeglass frame makes contact with the barrier, the axis of the lens is defined as parallel to the barrier.

The membrane is preferably flexible to allow a curved eyeglass frame or lens to make contact with the membrane at all points of interest, thus generating the greatest possible contrast between the shadow and the areas surrounding the shadow. An image of the shadow is captured by an imaging device or transducer, preferably by a charge coupled device (CCD) camera. A field lens is preferably positioned optically between the flexible membrane and the camera in order to prevent the image from being distorted by variations in distance between the membrane and the camera due to the flexible nature of the membrane.

In one embodiment of the present invention, particularly useful for imaging the edge of transparent frames (such as frames made of transparent plastic) a first linear polarizing filter is positioned optically between a light source and the membrane. The light source may be either artificial or natural. A second linear polarizing filter, oriented at 180° from the first filter, is placed optically between the membrane and the camera. Accordingly, light which passes through the first filter and then through a doubly refracting medium (such as substantially transparent plastic used to fabricate some eyeglass frames and most eyeglass lenses) is at least partially blocked by the second filter, while light that does not pass through a doubly refracting medium is essentially not blocked by the second filter. Thus, the first and second polarizing filters allow a high definition image to be attained for substantially transparent plastic. The image is normalized to provide the greatest contrast.

The image captured by the imaging device is presented to a "frame grabber" to be digitized. Preferably, the image that includes the object (the object image) is subtracted from a reference image taken prior to placing the eyeglass frame or lens on the membrane. The absolute value of the difference between the reference image and the object image (i.e., the difference image) is then communicated to a general purpose computer, such as a personal computer, which executes a software program to: (1) identify the edges of the image so as to define the perimeter, (2) orient the image by identifying an orientation line placed upon a lens if the lens is not in a frame, and (3) measure the distance between lenses if an eyeglass frame is being measured.

The computer identifies the edges of a frame or lens (such as a transparent, opaque, or solid dummy lens) by calculating a local derivative for selected points in the digitized image. Once an edge is identified, the local gradient and divergence of the image is calculated to determine which direction to move along the image in order to follow the edge. By interpolating through discontinuities and ignoring small obstructions (such as nasal pads), a continuous closed convex curve is calculated for the lens.

If an eyeglass frame is being measured, then a depth gauge indicator preferably providing a digital output is used to measure the depth of a groove in the frame into which a lens is recessed when mounted in the eyeglass frame. The depth of the groove is needed to optimally map the shape of the inner edge of the eyeglass frame to the shape of the lens.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 7 is an illustration of a 3 by 3 grid of points which is analyzed in accordance with the preferred embodiment of the present invention.

FIG. 9b is a plot of the first derivative of the intensity levels at the line of points of which the intensity levels are plotted in FIG. 9a.

FIG. 9c is a plot of the second derivative of the intensity levels at the line of points of which the intensity levels are plotted in FIG. 9a.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Description of apparatus

Figure 1:
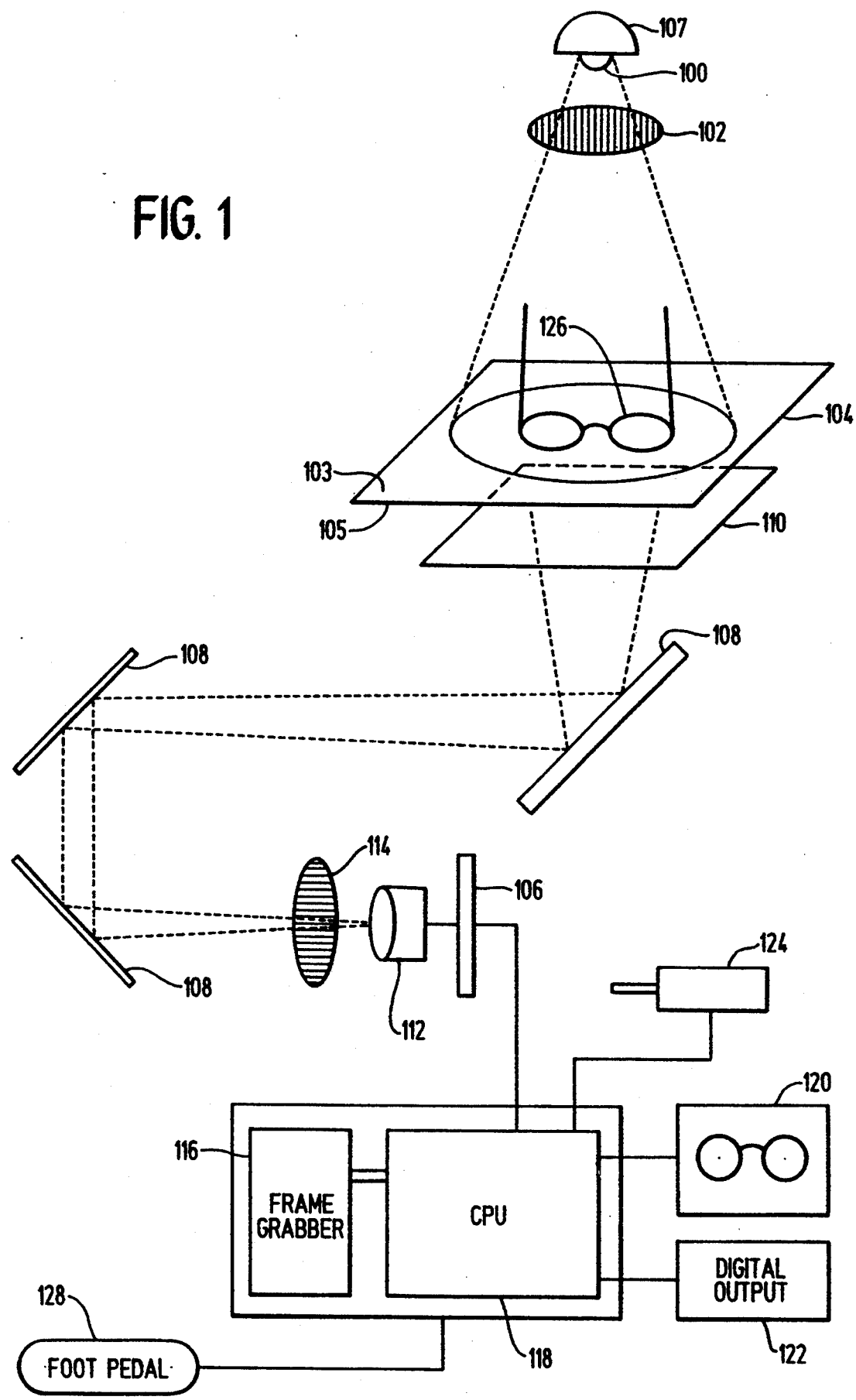
FIG. 1 is a block diagram of the preferred embodiment of an edge measurement apparatus for non-contact digitization of eyeglass frames and lenses in accordance with the present invention.

FIG. 1 is a block diagram of the preferred embodiment of a measurement apparatus for non-contact digitization of eyeglass frames and lenses in accordance with the present invention. In the preferred embodiment, a light source 100, which is preferably essentially a high intensity point source (such as a halogen bulb), emits light through a linear polarizing filter 102 to illuminate a first side 103 of a shadow generation surface, which is preferably a thin (approximately 0.1"), flexible, translucent, resistent membrane 104. Alternatively, the light source may be overhead lighting fixtures, the sun, or any other source or combination of sources. Ambient light supplied by such sources may illuminate the membrane directly or by reflection through a lens and/or mirror optical path. In one embodiment, when the membrane is lit only by ambient light, the second side 105 of the membrane 104 is preferably shielded from exposure to ambient light which does not pass through the first side 103 of the membrane 104.

The membrane 104 may be fabricated from latex or silicone. Preferably, sheets of silicone commercially available from Torr Technologies, Inc., for example are used. A reflective hood 107 may be placed around one side of the light source to further concentrate the light on the membrane 104. In the preferred embodiment of the present invention, the membrane 104 does not substantially depolarize polarized light which passes through the membrane 104. The membrane 104 is preferably removable and may be replaced when worn. The membrane 104 serves as a shadow generation surface upon which a shadow of objects placed optically between the membrane 104 and the light source 100 is cast. In addition, the membrane 104 acts to homogenize the light, so that even light from a point source will not cause blooming in a light sensing transducer.

A light sensitive transducer 106 (which in the preferred embodiment of the present invention is a charge coupled device camera or vidicon or similar imaging device) responds to variations in light projected through the membrane 104 by outputting a representation of the intensity levels of points on a second side 105 of the membrane 104. In one embodiment of the present invention, the output of the transducer 106 is a sequence of intensity values, each such intensity value being output in succession in a raster scan to indicate the relative location of the point having that intensity value, as is well known in the art. Alternatively, the intensity levels may be associated with a code or signal which indicates the relative location of an associated intensity level. A plurality of other methods for determining the relative position of points at which particular intensity levels are detected are possible. For example, synchronization signals may be output together with the intensity values to identify the location of points having the intensity level that is indicated by the output. Such synchronization signals may be multiplexed into the output signal that represents the intensity levels, or may be provided on separate dedicated synchronization signal lines. Therefore, it should be understood that any method for imaging and determining intensity levels, and the relative location of points having those intensity levels, may be used in the present invention.

In the preferred embodiment of the present invention, light projected through the membrane 104 reaches the transducer 106 via a series of reflective surfaces, such as mirrors 108 which fold the optical path of the light. The mirrors 108 allow the volume required for the combination of a field lens 110 and the transducer 106 to be reduced, while maintaining the required focal length of the optical path traversed by the light. Therefore, the system may be packaged more conveniently.

In an alternative embodiment of the present invention, the transducer 106 may be located on the same side of the membrane 104 as the light source and the object being digitized (i.e., the lens or frame). In such an embodiment, the shadow cast on the membrane 104 is perceived by the transducer 106 as a set of intensity levels. The object which casts the shadow may be positioned spaced from the membrane to allow the shadow to be perceived without interference by the direct image of the object.

In the preferred embodiment, the field lens 110 is provided to ensure that an image of the shadow projected through the membrane 104 is not distorted due to variations in the distance between the membrane 104 and the transducer 106. Such lenses are well known in the art. In the preferred embodiment, the field lens 110 has a radius of curvature equal to approximately 129 mm at a first surface and an infinite radius of curvature at the base. A conventional C-mount lens 112 preferably having a focal length of 25 mm and an f/number of f/1.4 is used to focus the image presented to the transducer 106.

A second linearly polarizing filter 114 is preferably placed optically between a mirror 108 and the C-mount lens 112. The second linearly polarizing filter 114 is oriented at approximately 180° from the first filter. Thus, light that is linearly polarized by the first filter 102 (and not substantially depolarized by the membrane) is not substantially attenuated by the second filter 114. However, light that passes through a doubly refracting medium (such as substantially transparent plastic used to fabricate some eyeglass frames and most eyeglass lenses) is elliptically polarized changing the angle of polarization and thus causing such light to only partially pass through the second filter 114. Accordingly, a high contrast image of the essentially transparent plastic is attained. The intensity of the luminance of the image is normalized to provide the greatest possible contrast in the image. For example, if the greatest intensity value detected by the transducer 106 is below the maximum possible intensity value, then each intensity value is multiplied by a constant which normalizes the image, such that the intensity level at the point of greatest intensity has a value equal to the maximum possible. Since those areas of the membrane 104 that are in the shadow of an object would be near zero, the intensity value of those areas would remain small in contrast to those areas of the membrane 104 that are fully illuminated.

The transducer 106 is preferably coupled to an analog to digital converter 116, such as a conventional frame grabber. For example, the digital converter used in the preferred embodiment of the present invention is a model CORTEX I, manufactured by Imagenation Co. The digital converter digitizes the output of the transducer 106. In the case in which the transducer provides a direct digital output, a digital converter 116 is not required.

The digitized output of the transducer 106 is coupled to a central processing unit 118 (CPU), such as any personal computer. In the preferred embodiment of the present invention, the CPU 118 comprises a standard IBM compatible personal computer with a hard disk drive for storage of programs to be executed by the computer. In the preferred embodiment of the present invention, programs that are unique to the operation of the present invention are programmed in the "C" programming language.

The CPU 118 is coupled to a display 120 and causes the display 120 to generate a visual output which depicts the digitized output of the transducer 106, and which is used to visually communicate information to a user. In the preferred embodiment, the display 120 includes a touch screen on which the visual output is displayed and which allows the user to respond to the CPU 118 by touching the screen at predetermined locations.

Preferably, the CPU 118 also has a digital output port 122 which allows information describing the size and shape to which a finished lens is to be cut to be communicated to remote equipment, either directly, or by communications equipment such as modems, wide area networks, local area networks, or any other means. In one embodiment, two such digital ports 122 are provided. A first port is configured in accordance with EIA standard RS-232. The second is configured in accordance with the "Ethernet" standard protocol for communication with devices coupled to an Ethernet communication network. For example, in the preferred embodiment, a "10NET" card, manufactured by Tiara, is installed in a standard IBM personal computer to provide the capability to communicate with devices coupled to an Ethernet communication network.

The apparatus of the present invention also includes a depth measurement gauge 124, such as model 575-213 IDU-1025E manufactured by Mitutoyo Co., to provide an accurate measurement of the depth of the groove 203 (see FIG. 2) of an eyeglass frame. Measurement of this value is important because the perimeter of a lens must fit against the bottom of the groove 23. Therefore, the depth of the groove 203 must be added to the radii of the inside edge of a frame as detected by most imaging techniques, including the preferred imaging technique of the present invention, to determine the diameter of the lens associated with the frame.

Figure 2:
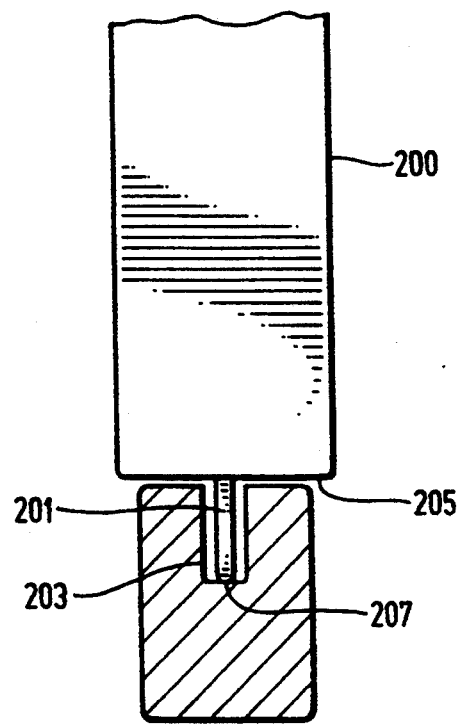
FIG. 2 is a plan view of a depth measurement gauge in accordance with the present invention.

FIG. 2 is a plan view of such a depth measurement gauge. The preferred gauge has a body 200 from which a retractable stylus 201 protrudes. The stylus 201 can be placed into a groove 203 on the inside of an eyeglass frame to measure the depth of the groove 203. A shoulder 205 acts as a stop to allow the depth of the groove 203 to be measured as a function of the amount the stylus 201 retracts due to contact between a distal end 207 of the stylus 201 and the bottom of the groove (i.e., the distance from the distal end 207 of the stylus 201 to the shoulder 205 with the stylus 201 in the groove 203). A multitude of alternative methods for determining the depth of a groove in a lens socket of an eyeglass frame are possible. For example: a mechanical measurement of the distance a stylus moves outward from a shoulder of the gauge (as opposed to the distance the stylus retracts); a mechanical measurement may be made by placing a ruler into the groove and reading the depth directly; and a radar or sonar style measurement may be made by measuring the phase shift between a transmitted wave and a reflection of the transmitted wave.

In the preferred embodiment, the depth measurement gauge 124 provides a digital output that is coupled to the CPU 118 so that the user does not have to read the measurement from the measurement gauge directly. However, in another embodiment, the depth measurement gauge 124 may be directly read by the user and the value entered into the CPU 118 through a keyboard, the touch screen included in the display 120, or any other data input device.

A foot pedal 128 is preferably coupled to the CPU 118. The foot pedal 128 allows the user to initiate the capture of an image of an object. The image is continuously displayed. Once the foot pedal 128 is activated, the image that was most recently communicated to the CPU 118 is stored and will not be overwritten. Alternatively, the user may initiate the capture of an object by touching the touch screen within the display 120.

Figure 3:
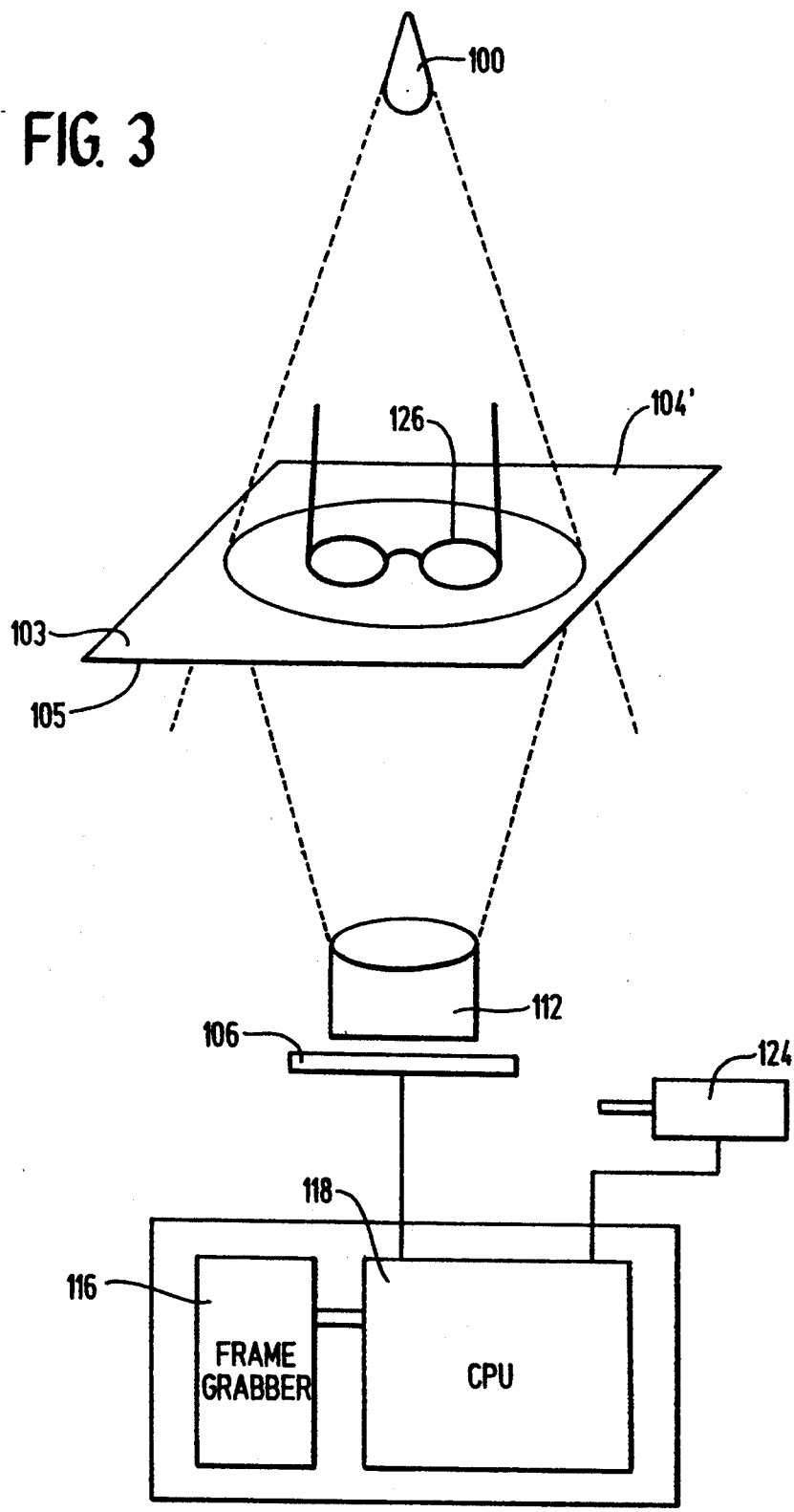
FIG. 3 is a block diagram of a basic system in accordance with the present invention.

In an alternative embodiment of the present invention, a more basic system in accordance with the present invention does not require each of the components described above. Such a basic system is illustrated in FIG. 3 and comprises: (1) a light source 100, (2) a translucent membrane 104' which may be rigid and may depolarize polarized light, (3) a transducer 106, (4) an image digitizer (in the case in which the transducer 106 does not output digital information), and (5) a CPU 118 to calculate the coordinates of the perimeter of an object placed on the membrane 104'.

Operation of the present invention

As stated above, the present invention is a non-contact measurement apparatus for digitally determining the shape and size of the outer perimeter of a lens to be fitted into an eyeglass frame without requiring the user of the apparatus to have any special training or skill and without mechanically tracing a frame or template. The present invention determines the shape and size of the outer perimeter of a lens by illuminating either an eyeglass frame into which the lens is to be fitted, or a lens (such as a dummy lens) having the same shape as a lens to be fitted into an eyeglass frame. The information is then be transmitted to an edger which edges lenses based upon the information it receives from the present invention.

Figure 4:
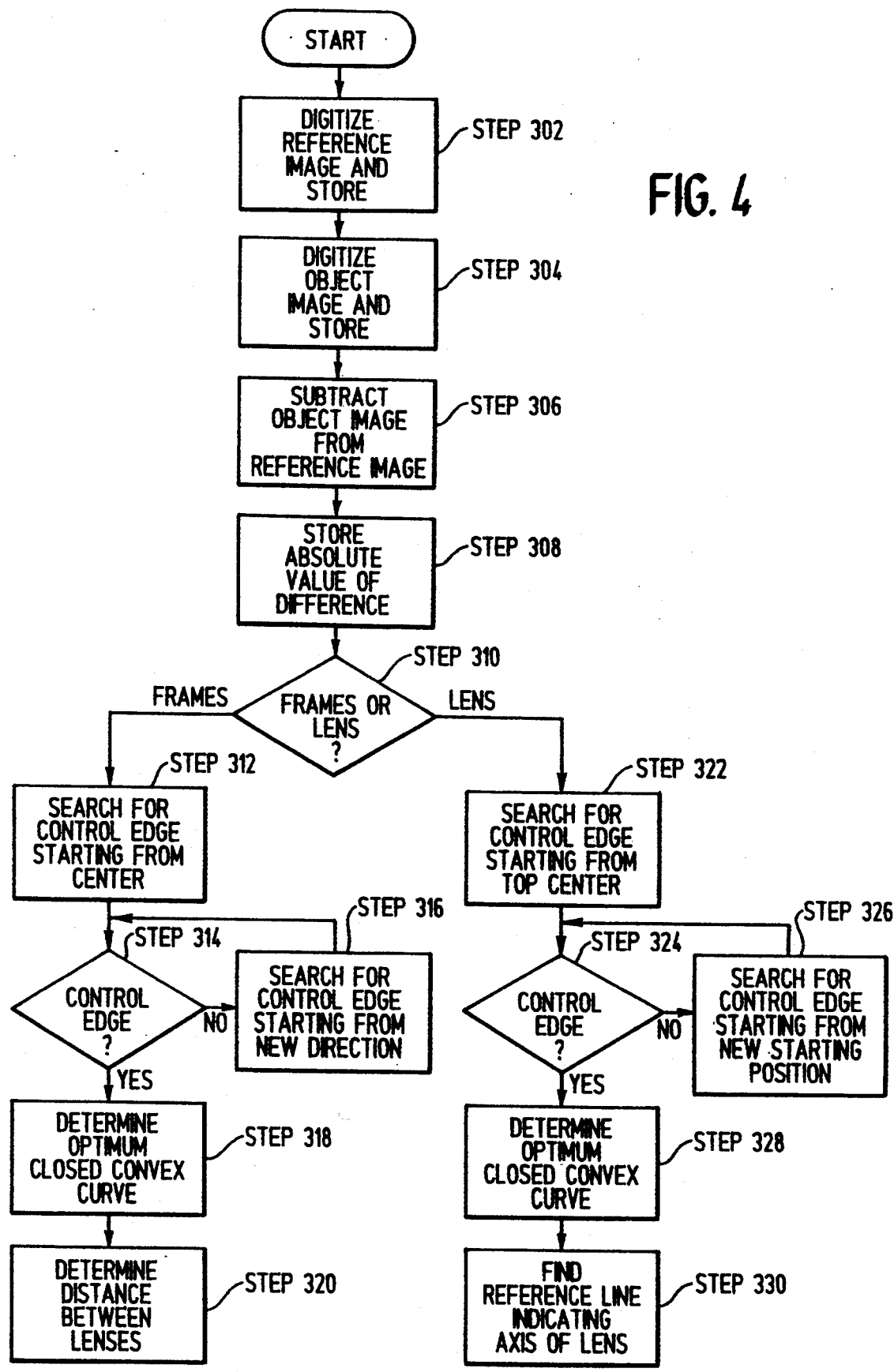
FIG. 4 is a high level flowchart of the steps preformed by the preferred embodiment of the present invention.

FIG. 4 is a high level flowchart of the steps performed by the preferred embodiment of the present invention. Light provided by the source 100 and preferably linearly polarized by the polarizing filter 102 is cast upon a first side of the unobscured membrane 104 (i.e., no object is present on the membrane 104) to establish a reference intensity level. The transducer 106 receives an image (the reference image) of a second side of the illuminated membrane 104, preferably reflected by the mirrors 108, filtered by the second polarizing filter 114, and focused by the C-mounted lens 112. Alternatively, the transducer 106 receives an image of the first side of the membrane. The intensity values of the light at a number of points, each point having a unique set of coordinates, are coupled from the transducer 106 to the digital converter 116. The digital converter 116 digitizes the intensity value associated with each point and presents the digital intensity values of each point as an array of data to the CPU 118. The CPU 118 stores these values as a reference image (STEP 302).

Figure 5:
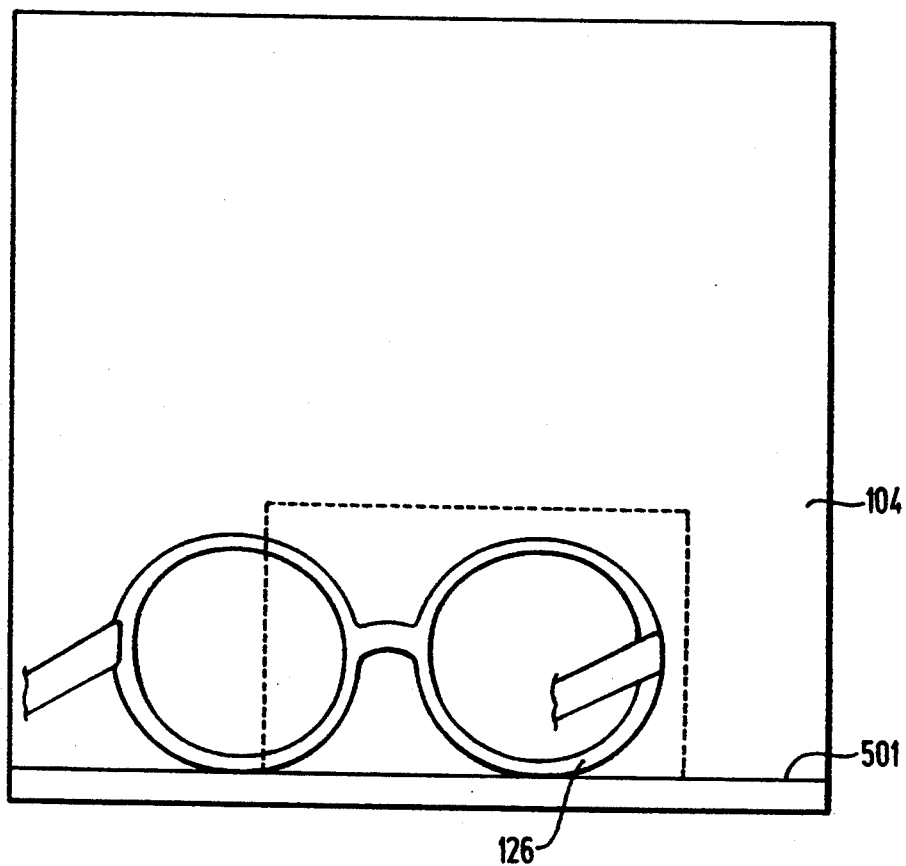
FIG. 5 is an illustration of the preferred position of an eyeglass frame upon the membrane of the present invention.

Once a reference image is established, an object (such as either an eyeglass frame 126 or a dummy lens) is placed upon the membrane 104. If the object is an eyeglass frame, the portion of the frame into which each lens is fitted (i.e., the lens sockets) are generally positioned on the membrane 104 such that an outer portion of each lens socket is in contact with a barrier 501. The barrier 501 ensures that the frame is aligned with the axis of the lenses parallel to a reference axis fixed with respect to the present invention. FIG. 5 illustrates the manner in which an eyeglass frame 126 is preferably to be position upon the membrane 104. If the object is a lens, then the lens is positioned generally in the center of the image. In the preferred embodiment of the present invention, the image is presented to the user on the display 120, thereby allowing the user to determine when the lens has been positioned properly within the image. Positioning an object as described above also allows the system to determine whether the object is an eyeglass frame or a lens, as will be described in detail below.

In the preferred embodiment of the present invention, the membrane 104 is flexible. If the surface of the object in contact with the membrane 104 is curved, then by pressing the object 126 gently into the membrane 104, maximum contact is established between the curved surface and the membrane 104 as the membrane deforms slightly to the curvature of the object 126. Providing contact between the object 126 and the membrane 104 causes minimal light to strike the membrane at the points of contract. Thus, the contrast in intensity between areas of the membrane 104 upon which the shadow is cast by the object 126 and those areas of the membrane 104 which are fully illuminated is maximized. Additionally, the boundary between such areas is sharper and more clearly defined. Furthermore, even if some areas of the curved surface of the object 126 are not brought into contact with the membrane 104, bringing those areas into closer proximity to the membrane 104 causes the contrast to be greater, thus producing a more detailed shadow upon the membrane 104.

Once the transducer 106 receives the object image (i.e., the image of the membrane 104 including the object's shadow), the object image is digitized and coupled to the CPU 118, and stored therein (STEP 304). Digitizing and storing of the object image is preferably initiated by a user activating a switch 128. The switch is preferably activated by the user's foot, thereby freeing the user's hands to position the object 126. Alternatively, digitizing and storing the object image is initiated when the user touches a predetermined position on the touch screen of the display 120. Digitizing and storing may be continuous, and the image dynamically displayed. Activating a switch causes the image that is displayed to be captured. In an alternative embodiment, the best image within a predefined time interval is selected without user intervention. The image is displayed to ensure the user's satisfaction.

The intensity value of the object image is then subtracted from intensity value of the reference image to remove the background information (STEP 306). The absolute value of the difference is stored as a new object image (STEP 308). By calculating the absolute value of the difference between the old object image and the reference image, the object will appear to have only positive values of intensity.

The next step is to determine whether the object is an eyeglass frame or a lens (STEP 310). In the preferred embodiment of the present invention, this is done by searching the left side of the image for an edge (i.e., a substantial change in the intensity levels over a relatively short distance). The manner in which edges are found will be described in detail below. If an edge is found, then the object 126 is assumed to be an eyeglass frame. Otherwise, the object 126 is assumed to be a lens. This method is effective for determining whether the object is an eyeglass frame or a lens, since eyeglass frames are placed upon the membrane 104 such that the eyeglass frame extends beyond the left side of the image. In contrast, a lens should always be positioned generally on the right side of the membrane 104 leaving the left side of the image free of edges. Of course, this convention of relative placement could be reversed.

Figure 6:
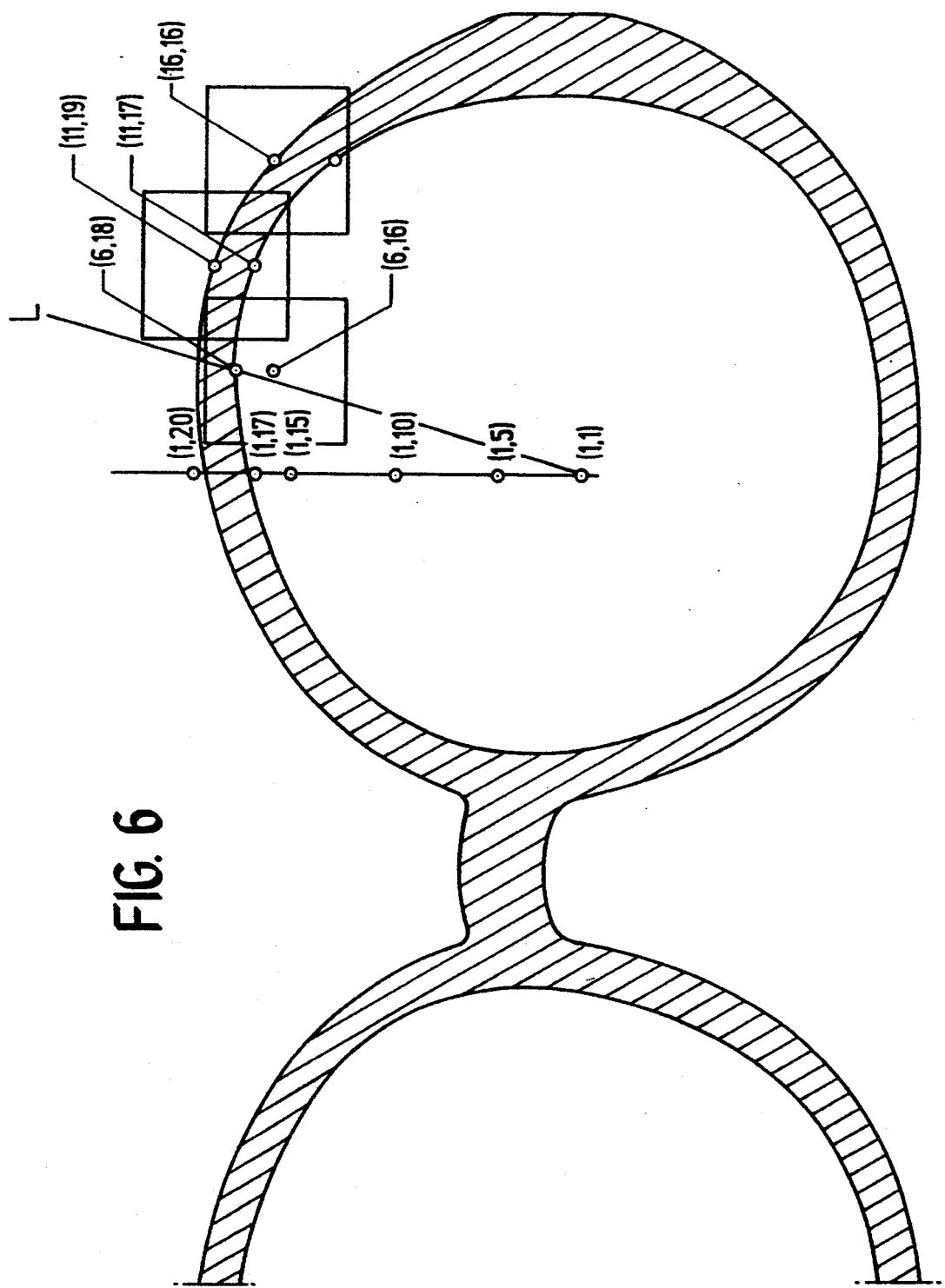
FIG. 6 is an illustration of an object image in accordance with the present invention.

If the object 126 is determined to be an eyeglass frame, then a search to find an edge preferably begins approximately at the center of the image. The search for an edge continues outward from the starting point in essentially a straight line until an edge is found (STEP 31 2). Once an edge is found, the edge is followed to determine whether the edge is a "control" edge (STEP 31 4). The manner in which the preferred embodiment follows an edge is described in detail below. When the object is an eyeglass frame, the control edge is the inside edge of a lens socket in an eyeglass frame. In the case of a lens, the control edge is the outside edge of the lens. Since the shape of the control edge is generally unique and well defined (i.e., a continuous closed convex curve), checking whether an edge that is found has a convex curve determines whether that edge is the control edge. For example, FIG. 6 is an illustration of an image of an eyeglass frame. The point (1,1 7) lies on an edge, since the intensity level changes rapidly. Following the edge reveals that the edge forms a convex curve. Therefore, the edge is the control edge for this image.

If the edge is not the control edge, then the process of finding an edge begins from the center point again, but moves outward in a different direction (STEP 31 6). When an edge is found, the edge is followed and again checked to determine whether that edge is the control edge (STEP 31 4). STEPS 31 4 and 31 6 are repeated until the control edge is found. In the preferred embodiment of the present invention, four attempts are made to find a continuous closed convex curve. The first attempt searches up from the center, and if an edge is detected, then follows a detected edge to the right. The second attempt searches up from the center, and if an edge is detected, then follows a detected edge to the left. The third attempt searches down from the center, and if an edge is detected, then follows a detected edge to the right. The last attempt searches down, and if an edge is detected, then follows the edge to the left. (Of course, these searches may be done in different sequences at different angles). If the control edge is not found in the course of these four attempts, then the user is informed that the image does not contain adequate information to determine the size and shape of a lens associated with the imaged object. If each attempt identifies a plurality of control points before failing to find a next control point, and the distance between each such plurality of control points is not greater than a predetermined distance, then the two closest points within two adjacent groups of control points are converted to polar coordinates, the origin of the polar coordinate system being equally distant from each of the two closest points. A set of points are then identified, each having the same radial coordinate, between the two closest points. Accordingly, a sufficient number of points to define the control edge are located.

Once the control edge is found, an optimum continuous closed convex curve is determined by removing any discontinuities and obstructions (STEP 31 8). Discontinuities and obstructions can occur due to nasal pads, decorative features, etc. Since such discontinuities and obstructions are typically small with respect to the overall contour of the control edge, the control edge can typically be located and obstructions removed by interpolating through such discontinuities and obstructions. The discontinuity or obstruction must be less than a predetermined length along the control edge or the process will fail. Details of the manner in which obstructions and discontinuities are removed is provided below.

Next, the distance between lenses is determined (STEP 320). This is accomplished in the preferred embodiment by finding the point along the control edge that is farthest to the left. A mirror image of the portion of the control edge near the point which is farthest to the left is then generated. A correlation operation is performed in known fashion to identify the portion of the image that most closely correlates to the mirror image. The distance between the control edge of the mirror image and the control edge of the portion of the image used to generate the mirror image can then be measured to determine the distance between lenses, and thus, the proper location of the optic center of the lens.

Returning to STEP 310, if the object 126 is determined to be a lens, then the search for an edge preferably begins at the top center of the image and proceeds downward in a generally straight line (STEP 322). Once an edge is found, the edge is followed to the right to determine whether that edge is the control edge (STEP 324). If the edge is not continuous, then the edge is instead followed to the left. If the edge is again found not to be continuous, then the starting point is preferably moved to another position at the outer edge of the image. In the preferred embodiment of the present invention, the search is then conducted starting from the bottom center. The search proceeds again in a generally straight line toward the center of the image until another edge is found. STEPS 324 and 326 are repeated until the control edge is found.

Once the control edge is found, an optimum continuous closed convex curve is determined by removing any discontinuities and obstructions in a manner similar to that described above (STEP 328). The most common obstruction is caused by printing that appears on some dummy lenses.

Next, the horizontal axis through the center of the lens is identified (STEP 330). In the case of a lens, the lens is marked by a user with a horizontal reference line to aid in identifying the axis. By searching for a straight line starting at a point near the center of the lens, the horizontal reference line can be found. Once the reference line is found, the slope of the reference line is determined. The horizontal axis is parallel to the reference line and crosses through the geometric center of the lens.

The geometric center is found by using a "box" method. In accordance with the box method, the point $X_{i,j}$ having the greatest value of i along the abscissa and the point $X_{i,j}$ having the least value of i along the abscissa are identified. The values of i for each point are added and divided by two to determine $i_c$. Likewise, the two points $X_{i,j}$ having the greatest value of j along the ordinate, and the least value of j along the ordinate are identified. The values of j of each point are added and divided by two to determine $j_c$. Assuming that the outer perimeter of the lens is a continuous closed convex curve, the geometric center of the lens is located at $(i_c, j_c)$.

Each lens of a pair is assumed to be an identical mirror image of the other. While this is not entirely true, the approximation is close enough that characterization of a single lens or lens socket is all that is needed to determine the shape and size of each lens of the pair with sufficient accuracy to allow both lenses to be edged from finished lenses so as to fit into the frame for which they are intended.

The present invention is preferably calibrated before use by placing an object with known size and shape on the membrane 104. In accordance with a calibration procedure, the size and shape of the object are entered into the CPU 118 by the user through the touch screen, a keyboard, or any other input device. The control edge of the object is identified. By scaling the points of the control edge to the known size and shape of the object, a calibration factor is determined. The calibration factor is then stored and used to scale each other object that is imaged with the invention. The accuracy of the present invention can be verified by placing an object having known size and shape on the membrane 104 and ensuring that the measurement of the object is accurate.

Method for finding the first control point

In accordance with the present invention, an edge of an object placed upon the membrane 104 of the present invention is identified by calculating a local derivative of the intensity of points (pixels) that comprise an image of the membrane 104. The derivative of the intensity identifies areas at which the intensity changes rapidly. Since there are three variables (i.e., i, j, and intensity), the derivative of the intensity at any point can be calculated in any direction on the plane formed by an x-axis and y-axis. In the preferred embodiment of the present invention, the points that are considered in each attempt to find the first control point (i.e., the first point identified as being on the control edge), lie in a 3 by 3 grid. FIG. 7 is an illustration of such a 3 by 3 grid of pixels within an image. Alternatively, the area that is analyzed can be of any practical size. The point at the center of the grid is located at the point $X(i,j)$ within the image. The other 8 points in the grid are $X(i-1,j+1)$, $X(i,j+1)$, $X(i+1,j+1)$, $X(i-1,j)$, $X(i+1,j)$, $X(i-1j-1)$, $X(i,j-1)$, and $X(i+1,j-1)$. It can be seen in the preferred embodiment in which an area comprising 9 points, a directional derivative of the intensity can easily be taken in any one of 8 different directions originating at the point $X(i,j)$ The formula used to calculate the derivative of the intensity in the horizontal direction when the points in question are to the right of the center $X(i,j)$ in accordance with the preferred embodiment of the present invention is:

$$(X_{i-1,j} - X_{i+1,j})$$

where $X_{i,j}$ is the intensity value of the point in the image located at the coordinate i along the x-axis, and j along the y-axis. The derivative is positive if the intensity value of the point to the left is greater than the intensity value of the point to the right.

The formula used to calculate the derivative of the intensity in the horizontal direction when the points in question are to the left of the center $X(i,j)$ in accordance with the preferred embodiment of the present invention is:

$$(X_{i+1,j} - X_{i-1,j})$$

where $X_{i,j}$ is the intensity value of the point in the image located at the coordinate i along the x-axis, and j along the y-axis. The derivative is positive if the intensity value of the point to the right is greater than the intensity value of the point to the left.

The derivative of the intensity in the vertical direction above the center $X(i,i)$ in accordance with the preferred embodiment of the present invention is:

$$(X_{i,j-1} - X_{i,j+1})$$

The derivative of the intensity in the vertical direction below the center $X(i,i)$ in accordance with the preferred embodiment of the present invention is:

$$(X_{i,j+1} - X_{i,j-1})$$

In addition, a direction derivative can be calculated in the direction 45° clockwise from the horizontal axis. The formula for such a directional derivative is:

$$(X_{i+1,j+1} - X_{i-1,j-1})$$

Also, a directional derivative can be calculated in the direction 45° counter-clockwise from the horizontal axis. The following is the formula for such a derivative:

$$(X_{i-1,j+1} - X_{i+1,-1})$$

The negative of each of these directional derivatives points in the opposite direction.

In the preferred embodiment of the present invention, the effects of random variations in the intensity of the image can be reduced by averaging the intensity value of each point with the intensity values of surrounding points. In the preferred embodiment of the present invention, the intensity of each point $X(i,j)$ is averaged by summing the intensity levels of the points $X(i,j)$, $X(i-1,j+1)$, $X(i,j+1)$, $X(i+1,j+1)$, $X(i-1,j)$, $X(i+1,j)$, $X(i-1,j-1)$, $X(i,j-1)$, and $X(i+1,j-1)$, and dividing by 9.

The search for the first control point preferably proceeds along a generally straight line. For example, in the first attempt to find the first control point on an eyeglass frame, the derivative in the vertical direction at each point along a vertical line from the center of the image to the top of the image is calculated until a positive value greater than a positive threshold is found. The first point at which the derivative is positive is identified as the first control point.

Because the control edge is expected to be a generally convex smooth closed curve, the direction of a control edge can be expected to lie generally perpendicular to a radius from the center of the image. Therefore, only one directional derivative need be calculated in order to find the first control point. By determining the coordinates of the point at which the derivative is being calculated, a determination can be made as to which one of the 8 directional derivatives should be calculated to find a control point. For example, if the point at which the derivative is being calculated is located generally above the center of the image, then the control edge should be generally horizontal. Therefore, the first control point can be found by performing the directional derivative in the upward vertical direction (i.e., $(X_{i,j-1})-(X_{i,j+1})$). Similarly, if the point is located in the area of the image that is generally to the lower right of the center of the image, then the directional derivative in the downward/right direction (i.e., $(X_{i+1,j-1})-(X_{i-1,j+1})$) is calculated. In the preferred embodiment of the present invention, 8 areas are defined. The 8 areas are bounded by 8 equally spaced radii emanating from the center of the image outward. The first area is bounded by radii at 22.5° and 337.5° (the radii at 0° being coincident to the positive portion of the y-axis). However, other angles and a different number of areas may be used.

A copy of the code that is used in the preferred embodiment of the present invention to determine the first control point is provided below as an appendix.

Method for following an edge

FIG. 6 graphically illustrates one method for finding and following an edge.

Figure 8:
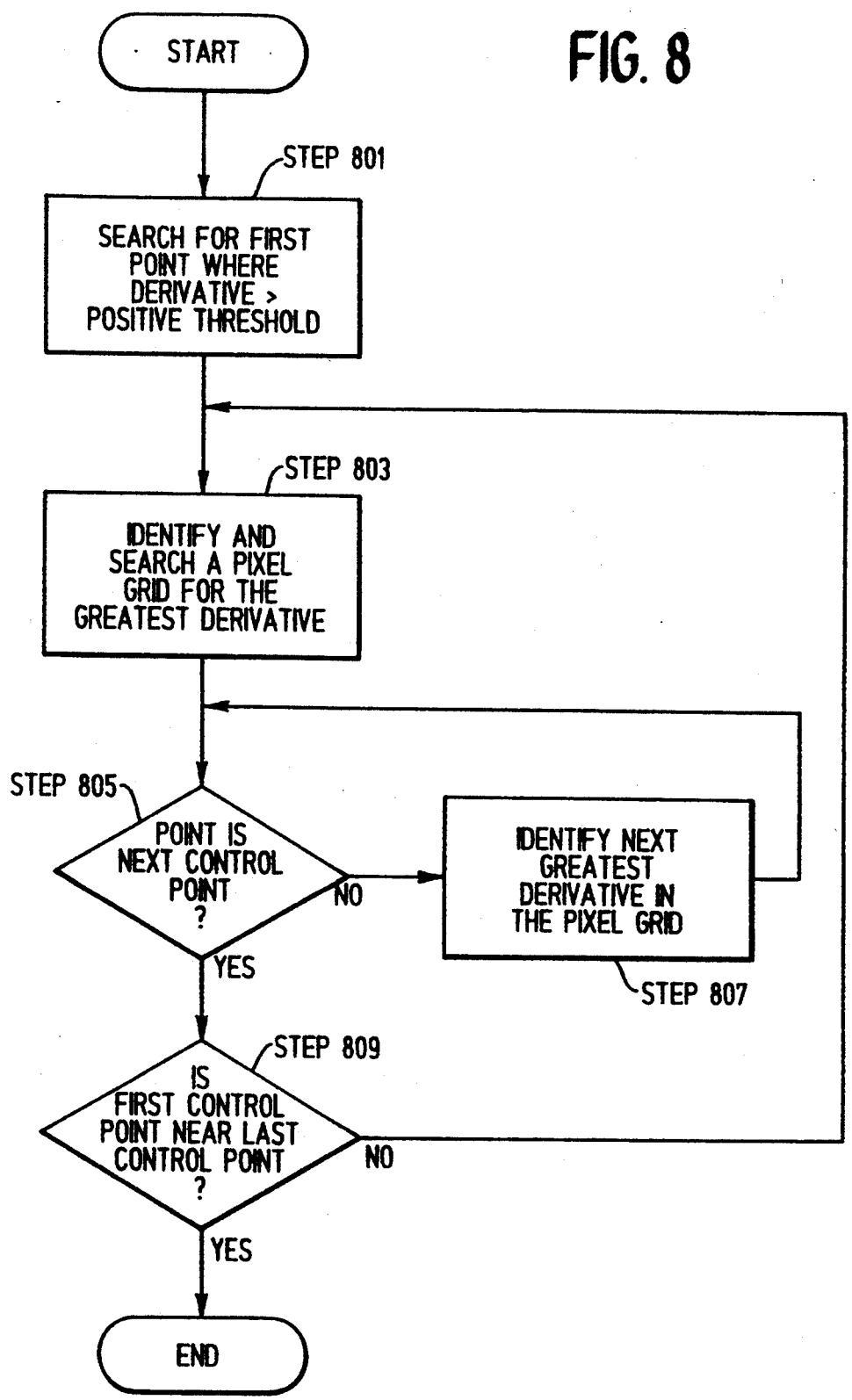
FIG. 8 is a flowchart of a method for finding and following an edge of an object within an object image.

FIG. 8 is a flowchart of the steps of the method. In FIG. 6, the image is simplified to either a light or dark value to simplify the example. However, in reality the image comprises a wide variety of intensity values (for example, 256 in the preferred embodiment).

Initially, a search is made for a point at which the derivative of intensity is positive in the direction of the y-axis. The search starts from (1,1), and preferably moves point by point upward (STEP 801 ). For example, the intensity level of the point (1,2) is subtracted from the intensity value of the point (1,0). In the example illustrated in FIG. 6, the difference is equal to zero, since both points have the same intensity value. The derivative at the next point along the line of points (1,y) is checked for a positive value above a threshold. If the derivative is not above the threshold, the derivative at the next point along the line is checked. Once the derivative at a point is determined to be above the threshold, that point is designated as the first control point. In the example shown in FIG. 6, the value of (1,18) minus the value of (1,16) is positive, since the intensity level of (1,18) is greater than the intensity value of (1,16), as depicted by the fact that the point (1,18) is shaded. After finding the first control point, a pixel grid of a predetermined size (such as 7 by 7 in one embodiment), centered a predetermined number of pixels away (such as 5 pixels to the right) is searched for the point at which the derivative is greatest in any direction (STEP 803). Alternatively, only the derivative in the direction normal to a radius of the image need be calculated. In one alternative embodiment, the direction of the derivative is determined by identifying in which of 8 different regions the point is located. The regions are bounded, as described above, by 8 equally spaced radii emanating from the center of the image.

In the present example, the center of the 7 by 7 grid would be at (6, 16). In the preferred embodiment, 8 derivatives associated with each point are calculated. In the preferred embodiment of the present invention, the point at which a derivative is greatest in any direction is tested to determine whether that point is the next control point (STEP 805).

The point is preferably tested because, due to noise and other disturbances in the image, it is possible for the derivative of the intensity at a point within a pixel grid to be greater than the derivative at any of the other point in the grid, and still not lie on the control edge. Furthermore, the location of the next control point within each pixel grid can be more accurately identified by calculating the second derivative of the intensity for each point within the grid and identifying points at which the second derivative continuously rises, falls, crosses zero, and rises again. In an alternative embodiment of the present invention, the point having the largest derivative is assumed to be the next control point.

Figure 9C:
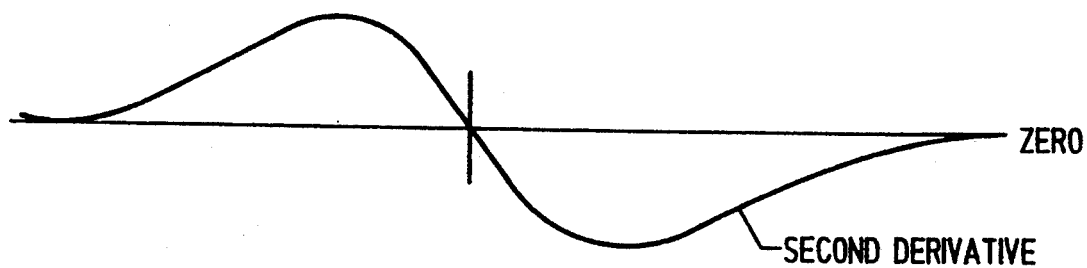
Figure 9B:
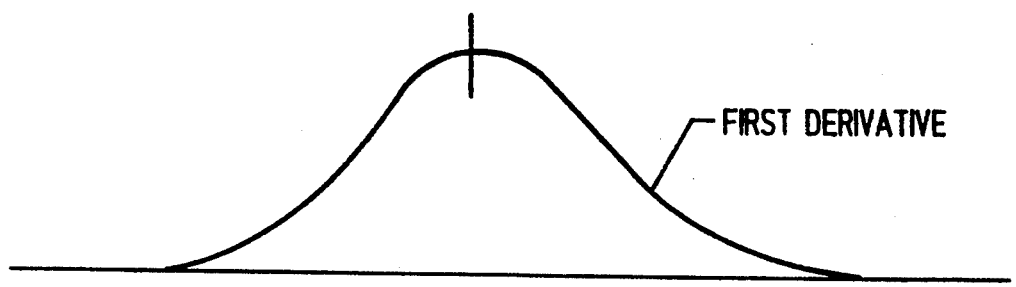
Figure 9A:
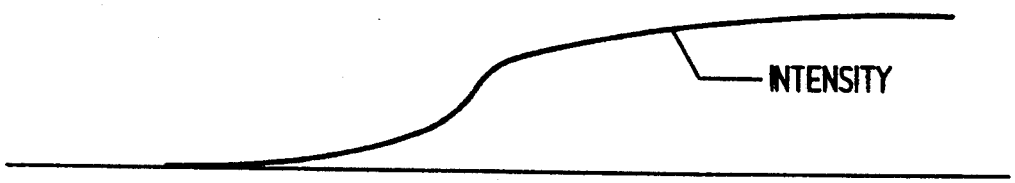
FIG. 9a is a plot of the intensity values of a line of points in an object image.

FIG. 9a is a continuous plot of intensity of points near the control edge, which lie along a line L that is generally perpendicular to the control edge. FIG. 9b is a continuous plot of the first derivative at those points. FIG. 9c is a continuous plot of the second derivative of the intensity at each point. Since the peak of the curve of the first derivative (the point at which the intensity is increasing most rapidly) is identified by the point at which the second derivative crosses zero, the control edge also occurs at the point at which the second derivative crosses zero, approaching from a positive value. Therefore, by calculating the second derivative of the intensity at the points near the point having the greatest derivative, a more definite determination can be made as to the location of the next control point.

It should be understood that, for the sake of simplicity, the resolution in the example illustrated in FIG. 6 is not as fine as the resolution in the preferred embodiment of the present invention. Also, the intensity of the points in FIG. 6 is shown to be either high or low. Therefore, the plot of the first derivative and the second derivative at the points shown in FIG. 6 may not appear smooth. However, if the resolution were greater and the intensity increased in a manner which is common of a digitized image of a shadow projected upon a membrane, then the plot of the first and second derivative would be generally similar to the plots shown in FIGS. 9a, 9b, and 9c.

The second derivative at the point $X_{i,j}$ in the horizontal direction is calculated by the formula:

$$(X_{i-1,j}-2X_{i,j}+X_{i+1,j})$$

Similar formulas, which will be obvious to those skilled in the art, are used to calculate the second derivative in each other direction.

In the preferred embodiment, if the point having the greatest derivative is not the control point, then the point having the next greatest derivative is tested (807). Once at least two adjacent control points are located, the search for the next control point commences in a grid centered at a point which is intersected by a line through the last two control points, and which is a prescribed number of pixels from the last control point. In the present example, the derivative at the point (6,18) is greatest. If the point (6,18) is the next control point, the search for the third control point is conducted in a 7 by 7 grid that is centered at a point 5 pixels from (6,18) and which lies on the line that passes through point (6,18) having a slope of 1/5 (i.e., the slope of the line through the last two control points). The center of the next 7 by 7 grid is at the point (11,1 9). Therefore, the derivative at each of the points within the 7 by 7 grid centered at the point (11,19) is calculated and the point having the greatest derivative is tested to determine whether that point is the next control point. In the present example, that point is at (11,1 7), and is the next control point. Therefore, the next 7 by 7 grid is centered at (16,16). The location of the last control point is compared to the location of the first control point to determine the distance between the two. If the first control point is within a predetermined distance of the last control point, then the process ends. Otherwise, STEPS 803 through 809 are repeated until a closed curve is identified (i.e., until a control point is found to be within a predetermined range of the first control point (1,17)) (STEP 809).

A copy of the code that is used in the preferred embodiment of the present invention to follow the control edge is provided below.

Finding the optimum continuous closed convex curve

Once the control edge has been followed around and returns to approximately the first control point, the shape of the control edge is optimized. This optimization includes removing obstructions, such as a nose pad or a temple piece. In accordance with the preferred embodiment of the present invention, an obstruction is identified as any portion of the curve that does not conform to a generally continuous closed convex curve with respect to the center of the closed curve formed by the points along the control edge. "Outliers" (i.e., points which appear to be on a control edge, but which would cause the curve to take on a concave shape) are also ignored. Removing obstructions is accomplished by generating a straight line through the obstruction. Next, if none of the points along the straight line are edges, then the straight line is curved by translating the end coordinates of the straight line from cartesian coordinates to polar coordinates. The radial coordinate at each point along the new curve can be determined by varying the value of the radial coordinate linearly with respect to the angular coordinate. The points thus identified are then translated back to the cartesian coordinate system. Points along the straight line that are one an edge are assumed to be correct and are considered together with the points near the obstruction when correcting the radius of those point which are not on an edge.

If the shape formed by connecting the control points cannot be closed, then the user is alerted to the fact that the image is not adequate to allow the shape of a lens associated with the object to be properly digitized and determined. In the preferred embodiment of the present invention, the user is alerted by a message displayed on the screen of the display 120.

A copy of the code that is used in the preferred embodiment of the present invention to optimize the control edge is provided below.

Figure 10:
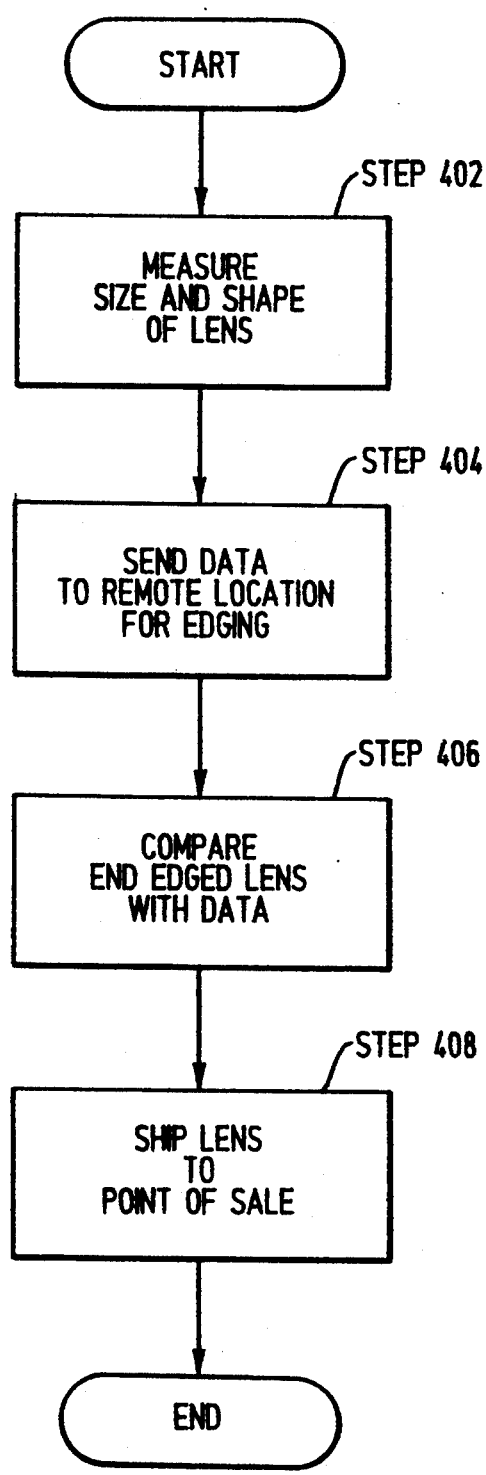
FIG. 10 is a flowchart of one method for edging finished lenses in accordance with the present invention.

FIG. 10 is a flowchart of one method for edging finished lenses in accordance with the present invention. A measurement of the outer perimeter of a lens is taken (STEP 402) using the apparatus shown in FIGS. 1 or 3, and depth of the groove in the lens socket, if necessary. The generated measurement data is sent to a remote location (preferably by any form of electronic communication, such as over telephone lines by modem) at which a pair of finished lenses can be edged to conform to the data (STEP 404). The end product is then measured using the inventive apparatus. The resulting data is then compared with the original data to verify the accuracy of the edging process (STEP 406). Only after the edging process has been verified is the finished lens shipped back to the point of sale (STEP 408).

One advantage of the present method for measuring the outer perimeter of a lens is that by performing the process shown in FIG. 10, a customer who requires a new prescription for his old frames can retain possession of his old frames, even if the edging process is being done at a remote site. Furthermore, an outlet that sells eyeglasses, but does not wish to edge finished lenses, can electronically communicate to a remote site, information sufficient to edge a pair of finished lenses. Still further, the size and shape of to which the lenses are to be edged can be verified before the data is transmitted. Also, since a quality control inspection can be performed electronically to ensure that the lenses have been edged correctly, the lenses will fit properly within the frames for which they are intended. Still further, because the edging process in accordance with the present invention is more accurate, simpler, and requires less training, edging can be more easily accomplished at the point of sale. This simplification of the edging process also reduces the cost of edging.

A number of embodiments of the present invention have been described. Nevertheless, it will be understood that various modifications may be made without departing from the spirit and scope of the invention. For example, the membrane onto which a shadow is projected may be any material that allows a shadow projected from a first side to be detected when viewed from an opposing second side, such as glass (either clear, tinted, or frosted), polyethylene, paper, etc. Furthermore, any means for communicating information from the user to the edger may be used, such as a keyboard, touch pad, mouse, light pen, etc. Still further, the depth measurement gauge may be any instrument which allows the depth of a groove, into which a lens is to be inserted in the inner edge of an eyeglass frame, to be measured. Also, any type of CPU, whether general purpose or dedicated to the purpose of the present invention, may be used to receive digital information, identify a control edge, communication information to and from the user, and transmit information to external devices without departing from the spirit of the present invention. Furthermore, a number of independent processing devices may be used which each perform specific functions to accomplish the results described above. For example, a dedicated processor may be used to communicate information to other external devices. Another dedicated processor may be used to control the display and input devices. Still another dedicated processor may perform mathematical calculations required to identify and define a control edge.

Accordingly, it is to be understood that the invention is not to be limited by the specific illustrated embodiment, but only by the scope of the appended claims.

This is the code to decide if it is a frame or a lens

```
int     ArmazonMica( char far *img[Z] )
{
  int i, lin ;

if( LADO==DER )
        lin = 30 ;
  else
        lin = X-30 ;

for(i=65 ; i<400 ; i++){
        if( abs ( IntensidadGaussiana( img, i+2, lin ) -
                IntensidadGaussiana( img, i-2, lin )) > COTA3 )
                        return ARMAZON ;
  }
  return MICA ;
}
/**********************************************************/
```

This is the code to find the first derivative of the image

```
char DerivadaDireccionalGaussiana( char far *img[Z], int i, int j )
{
  int a, b ;
  char z ;
  float cte1, cte2 ;

b = Z/2 - i ;
  a = CX - j ;
  cte1 = 0.4142*a ;
  cte2 = 2.4142*a ;
  if( cte1 > -b ){
        if( cte2 > b ){
                if( cte1 > b )
                        z = IntensidadGaussiana( img, i, j-1 )
                                - IntensidadGaussiana( img, i, j+1 ) ;
                else    z = IntensidadGaussiana( img, i-1, j-1 )
                                - IntensidadGaussiana( img, i+1, j+1 ) ;
        }else{
                if( cte2 > -b )
                        z = IntensidadGaussiana( img, i-1, j )
                                - IntensidadGaussiana( img, i+1, j ) ;
                else z = IntensidadGaussiana( img, i-1, j+1 )
                                - IntensidadGaussiana( img, i+1, j-1 ) ;
        }
  }else{
        if( cte2 > b ){
                if( cte2 > -b )
                        z = IntensidadGaussiana( img, i+1, j-1 )
```

```
                        - IntensidadGaussiana( img, i-1, j+1 ) ;
            else z = IntensidadGaussiana( img, i+1, j )
                        - IntensidadGaussiana( img, i-1, j ) ;
    }else{
        if( cte1 > b )
            z = IntensidadGaussiana( img, i+1, j+1 )
                        - IntensidadGaussiana( img, i-1, j-1 ) ;
        else z = IntensidadGaussiana( img, i, j+1 )
                        - IntensidadGaussiana( img, i, j-1 ) ;
    }  }
    return z ;
}
/************************************************************/
```

This is the code with the whole digitizing process

```
int     Digitaliza( void )
{
    float auxx[N], auxy[N], angulo ;
    int i, j, h, a, b, c, d, e, ind, cont ;
    int dx, dy, contceros, sentido, intento, valido ;
    char max, pp ;
    union REGS inregs, outregs;
    int bb ;
    FILE *fp ;

TomaFotoMosca() ;
    RestaDeFondoTarjeta( I, fp ) ;
    Armazon_O_Mica = ArmazonMica( I ) ;
    CX = LADO==DER ? X-3*X/8 : 3*X/8 ;

sentido = -1 ;
    intento = 1 ;
    cont = 0 ;
    pp = PrimerPunto( I, &a, &b ) ;

if( pp == 0 )
        return 0 ;
    else{
        serpx[0] = a ;
        serpy[0] = b ;
    }
    while( intento ){ a = serpx[0] ;
    b = serpy[0] ;
    sentido *= -1 ;
    max = 0 ;
    dx = sentido*5 ;
    dy = 0 ;
    i = 0 ;
    contceros = 0 ;
    while( !(i>100 && sentido*dx>0 && sentido*a>sentido*CX) && i<N ){
```

```
            c = a ; d = b ;
            serpx[i] = c ;        serpy[i] = d ;
            a += dx ;   b += dy ;
            max = 0 ;
            dx = a ; dy = b ;
            for(j=-2 ; j<=2 ; j++){
                    for(h=-2 ; h<=2 ; h++){
                            e=DerivadaDireccionalGaussiana(I, b+h, a+j) ;
                            e *= Armazon_O_Mica ;
                            if( max < e ){
                                    dx = a+j ; dy = b+h ; max = e ;
                            }
                    }
            }
            a = dx ; b = dy ;
            dx = i ? a-serpx[i-1] : a-c ;      dy = i ? b-serpy[i-1] : b-d ;
            e = abs(dx) > abs(dy) ? abs(dx) : abs(dy) ;
            dx = 4*dx/e ;  dy = 4*dy/e ;
            c = b-Z/2 ; d = CX-a ;
            e = abs(c) > abs(d) ? abs(c) : abs(d) ;
            dx = dx + pp*sentido*1*c/e ; dy = dy + pp*sentido*1*d/e ;
            i ++ ;
            if( Armazon_O_Mica == MICA )
                    max += 1 ;
            if( (contceros = max < COTA1 ? contceros+1 : 0) == COTA2 )
                    break ;
    }
    valido = 1 ;
    if( contceros<COTA2 && abs(serpy[0]-serpy[i-1]) > 7 ){
            if( intento == 1 ){
                    intento = 2 ;
                    valido = 0 ;
            }
            else{
                    intento = 0 ;
                    valido = 0 ;
            }
    } else if( contceros == COTA2 ){
        if( intento == 1 ){
                intento = 2 ;
                i -= COTA2 ;
                for(j=0 ; j<i ; j++){
                        auxx[j] = serpx[i-j-1] ;
                        auxy[j] = serpy[i-j-1] ;
                }
                cont = i ;
                valido = 0 ;
        }
        else{
```

```
                    i -= COTA2 ;
                    if( fabs( serpx[i] - auxx[0] ) > 75 ||
                        fabs( serpy[i] - auxy[0] ) > 75 ){
                            for(j=1 ; j<i ; j++)
                            LineaEscala(serpx[j], serpy[j],
                                    serpx[j-1], serpy[j-1], 4 ) ;
                            valido = 0 ;
                            cont = 0 ;
                            break ;
                    }
                    for(j=i ; j<i+cont ; j++){
                            serpx[j] = auxx[j-i] ;
                            serpy[j] = auxy[j-i] ;
                    }
                    i += cont ;
                    cont = 0 ;
                    intento = 3 ;
                    valido = 1 ;
            }
    }
    if( valido ){
            if( intento != 1 ) gotoxy(13,4),printf("%c",174) ;
            if( intento == 3 ) gotoxy(14,4),printf("%c",29) ;
            gotoxy(37,4);
            printf("rad=%d   ",i) ;
    }
    Ordena( serpx, serpy, i ) ;
    EnvolventeConvexa(serpx,serpy,i) ;
    EquiespaciaL( serpx, serpy, i, 256, 0.0 ) ;

PUENTE = 0 ;
    if( Armazon_O_Mica == ARMAZON ){
            Puente( I, serpx, serpy, N, &PUENTE, &ind, &a, &bb ) ;
            if( LADO==DER ) PUENTE *= -1 ;
            if( LADO==DER ) PUENTE *= -1 ;
                    INDPTE = ind ;
            }
            else{
                    angulo = EjeGirado( I, serpx, serpy, N ) ;
                    RotaLenteAngulo( serpx, serpy, N, angulo ) ;
                    EquiespaciaL( serpx, serpy, N, N, 0.0 ) ;
            }
            intento = 0 ;
        }
    }
    if( !valido )
            return 0 ;

Ruido( 2000 ) ;
    return Armazon_O_Mica ;
}
/*************************************************************/
```

This is the code to find the line on a lens

```
float EjeGirado( char far *img[Z], float *x, float *y, int n )
{
    int i, j, c=0, xx, ini, fin, e=7, k, l, val, aux, ind ;
    float m, b ;
    struct complex control[500] ;

xx = min( x[(int)(n/e)], x[(int)(n-n/e)] ) ;
    ini = y[(int)(n-n/e)]+30 ;
    fin = y[(int)(n/e)]-30 ;
    for( i=ini ; i<fin ; i++){
        if( IntensidadGaussiana( img, i+2, xx )
            -IntensidadGaussiana( img, i-2, xx ) > COTA4 ){
            k = xx ;
            l = i ;
            i += 5 ;
            do{
                control[c].x = k ;
                control[c].y = l ;
                k -= 3 ;
                ind = 3 ;
                val = IntensidadGaussiana( img, l+2+ind, k )
                    -IntensidadGaussiana( img, l-2+ind, k ) ;
                for(j=-3 ; j<3 ; j++){
                    aux = IntensidadGaussiana( img, l+2+j, k )
                        -IntensidadGaussiana( img, l-2+j, k ) ;
                    if( aux > val ){
                        ind = j ;
                        val = aux ;
                    }
                }
                l += ind ;
                c++ ;
            } while ( c<500 && val >= COTA4 ) ;
        }
    }
    xx = max( x[(int)(n/2+n/e)], x[(int)(n/2-n/e)] ) ;
    ini = y[(int)(n/2+n/e)]+30 ;
    fin = y[(int)(n/2-n/e)]-30 ;
    for( i=ini ; i<fin ; i++){
        if( IntensidadGaussiana( img, i+2, xx )
            -IntensidadGaussiana( img, i-2, xx ) > COTA4 ){
            k = xx ;
            l = i ;
            i += 5 ;
            do{
                control[c].x = k ;
                control[c].y = l ;
                k += 3 ;
                ind = 5 ;
```

```
                val = IntensidadGaussiana( img, l+2+ind, k )
                        -IntensidadGaussiana( img, l-2+ind, k ) ;
                for(j=-5 ; j<5 ; j++){
                        aux = IntensidadGaussiana( img, l+2+j, k )
                                -IntensidadGaussiana( img, l-2+j, k ) ;
                        if( aux > val ){
                                ind = j ;
                                val = aux ;
                        }
                }
                l += ind ;
                c++ ;
        } while ( c<500 && val >= COTA4 ) ;
    }
}

RegresionLineal( control, c, &m, &b ) ;

return (RAZON*m) ;
}
/**********************************************************/
```

This is a Gaussian filter for the image to find a smooth first derivative

```
char IntensidadGaussiana( char far *img[Z], int x, int y )
{
    int i, j, z ;
    char res ;

z = 0 ;
    for(i=-1 ; i<=1 ; i++)
            for(j=-1 ; j<=1 ; j++)
                    z += img[x+i][y+j] ;

res = z/9 ;
    return res ;
}
/**********************************************************/
```

This is the code to find a first control point

```
int PrimerPunto( char far *I[Z], int *a, int *b )
{
    int p1, p2, i, x, z, cte, flag, ret ;

cte = Armazon_O_Mica ;
    flag = 1 ;
    x = CX ;

p1 = cte == 1 ? Z/2 : 15 ;
    p2 = cte == 1 ? 15 : Z/2 ;
```

```
        for(i=p1 ; cte*i>cte*p2 ; i-=cte){
            z = DerivadaDireccionalGaussiana( I, i, x ) * cte ;
            if( z > (cte==1 ? COTA3 : COTA5) ){
                *a = x ; *b = i ;
                if( DerivadaDireccionalGaussiana( I, i+cte, x )*cte +
                    DerivadaDireccionalGaussiana( I, i, x+1 )*cte +
                    DerivadaDireccionalGaussiana( I, i, x-1 )*cte > 2*z   ){
                    flag = 0 ;
                    ret = -1 ;
                    break ;
                }
            }
        }
    }
    if( flag ){ p1 = cte == 1 ? Z/2 : 440 ;
        p2 = cte == 1 ? 440 : Z/2 ;
        for(i=p1 ; cte*i<cte*p2 ; i+=cte){
            z = DerivadaDireccionalGaussiana( I, i, x ) * cte ;
            if( z > (cte==1 ? COTA3 : COTA5) ){
                *a = x ; *b = i ;
                if(DerivadaDireccionalGaussiana( I, i+cte, x )*cte +
                    DerivadaDireccionalGaussiana( I, i, x+1 )*cte +
                    DerivadaDireccionalGaussiana( I, i, x-1 )*cte > 2*z   ){
                    flag = 0 ;
                    ret = 1 ;
                    break ;
                }
            }
        }
    }
    if( flag )
        ret = 0 ;
    p2 = *b ;
    for(i=1 ; i<4 ; i++)
        if( (p1=DerivadaDireccionalGaussiana( I, *b+cte*i, x )*cte) > z )
            z=p1, p2=*b+cte*i ;
    *b = p2 ;
    return ret ;
}
/********************************************************/
```

This is the code to find the Distance Between Lenses (DBL)

```
void Puente( char far *I[Z], float *x, float *y, int n,
        int *largo, int *ind, int *a, int *bb )
{
    int i, j, max, min, p[31], q[31], suma ;
    int maxy, miny, ci, di, aux, inicio, fin ;

max = min = x[0] ;
    maxy=miny=y[0];
```

```
for(i=n-1 ; i>0 ; i--){
    if( max < x[i] )
        max = x[i], *ind = i ;
    viiiif( min > x[i] )
        min = x[i], *a = i ;
    if( maxy < y[i] )
        maxy = y[i], ci=i ;
    if( miny > y[i] )
        miny = y[i], di=i ;
}
if( LADO == DER ){
    aux = *ind ;
    *ind = *a ;
    *a = aux ;
} max = *ind ;

*a = (x[max] - x[*a]) ;
*bb = (y[ci] - y[di]) ;

for(i=0 ; i<31 ; i++){
    p[i] = 2*x[max] - x[(n-15+i+max)%n] ;
    q[i] = y[(n-15+i+max)%n] ;
} max = x[0] ;
for(i=1 ; i<31 ; i++){
    max = max > p[i] ? max : p[i] ;
    min = min < p[i] ? min : p[i] ;
} fin = LADO==DER ? min-5 : Z-max-5 ;
inicio = 20 ;

*largo = max = 0 ;
if( LADO == DER ){
    for(i=inicio ; i<fin ; i++){
        suma = 0 ;
        for(j=0 ; j<31 ; j++){
            suma += IntensidadGaussiana(I,q[j],p[j]-i-1)
                  - IntensidadGaussiana(I,q[j],p[j]-i+1) ;
        }
        if( max < suma )
            max = suma, *largo = i ;
    }
}
else{
    for(i=inicio ; i<fin ; i++){
        suma = 0 ;
        for(j=0 ; j<31 ; j++){
```

```
                suma += IntensidadGaussiana(I,q[j],p[j]+i+1)
                     - IntensidadGaussiana(I,q[j],p[j]+i-1) ;
            }
            if( max < suma )
                max = suma, *largo = i ;
        }
            PutPixelEscala(p[j]+*largo,q[j],13) ;
    }
}
/**********************************************************/
```

This is the code to substract the object image from the blank image.

```
void RestaDeFondoTarjeta( char far *I[Z], FILE *b )
{
    register i, j ;
    int h ;
    unsigned char far *tarjeta ;
    unsigned char fondo[X] ;

rewind( b ) ;
    outportb( 0x231, 32+2+1 ) ;
    tarjeta = (unsigned char far *) 0xD0000000L ;
    for(h=0 ; h<4 ; h++){
        outportb( 0x230, 16+h ) ;
        for(i=0 ; i<Y ; i++){
            if( h==3 && i == 100)
                break ;
            fread( fondo, sizeof( unsigned char ), X, b ) ;
            for(j=0 ; j<X ; j++){
                I[i+h*Y][j] = abs( fondo[j] - *tarjeta ) ;
                tarjeta ++ ;
            }
        }
    }
}
/**********************************************************/
```

This is the code to order ascending with respect to angles.

```
void Ordena( float *x, float *y, int n )

interpolacion lineal radial;

float radio[GR], angulo[GR], cx, cy ;
    float maxx=x[0], maxy=y[0], minx=x[0], miny=y[0] ;
    register i ;
    struct complex ordena[GR] ;
```

```c
if( n < 2 ){
    ModoPantalla( TEXTO_COLOR ) ;
    printf("Muy pocos en control, no?") ;
    ApagaFoco() ;
    exit(3) ;
}
for(i=1 ; i<n ; i++) {
    maxx = maxx > x[i] ? maxx : x[i] ;
    minx = minx < x[i] ? minx : x[i] ;
    maxy = maxy > y[i] ? maxy : y[i] ;
    miny = miny < y[i] ? miny : y[i] ;
}
cx = (maxx + minx) / 2.0 ;
cy = (maxy + miny) / 2.0 ;
for(i=0 ; i<n ; i++) {
    x[i] -= cx ;
    y[i] -= cy ;
}
for(i=0 ; i<n ; i++) {
    ordena[i].x = hypot( x[i], y[i] ) ;
    ordena[i].y = atan2( y[i], x[i] ) ;
    if( ordena[i].y < 0.0 )
        ordena[i].y += 2*M_PI ;
}
qsort(ordena, (size_t) n, (size_t)(sizeof( struct complex )),
                    ComparaComplejoY ) ;
for(i=0 ; i<n ; i++){
    radio[i]  = ordena[i].x ;
    angulo[i] = ordena[i].y ;
}
for(i=0 ; i<n ; i++) {
    x[i] = radio[i] * cos( angulo[i] ) + cx ;
    y[i] = radio[i] * sin( angulo[i] ) + cy ;
}
}
/*************************************************************/
```

This is the code to find the Convex Curve

```c
void EnvolventeConvexa( float *x, float *y, int m )

int ang, maxa, maxx=0, sig ;
int i, j, k, n, c ;
float xx[N], yy[N] ;
float inc, angulos[N], aj, ak, theta, t ;
float x1,x2,y1,y2,beta ;
float xmax, xmin, ymax, ymin, cx, cy ;

xmax=xmin=x[0], ymin=ymax=y[0] ;
for(i=1 ; i<m ; i++) {
    xmax = xmax > x[i] ? xmax : x[i] ;
    xmin = xmin < x[i] ? xmin : x[i] ;
```

```
        ymax = ymax > y[i] ? ymax : y[i] ;
        ymin = ymin < y[i] ? ymin : y[i] ;
}
cx = (xmax + xmin) / 2.0 ;
cy = (ymax + ymin) / 2.0 ;
for(i=0 ; i<m ; i++) {
        x[i] -= cx ;
        y[i] -= cy ;
} for(i=1 ; i<m ; i++)
        maxx = x[maxx] > x[i] ? maxx : i ;

k = 0 ;
angulos[k] = atan2(y[maxx],x[maxx]) ;
if( angulos[k] < 0.0 )
        angulos[k] += DOSPI ;

c = m / 4 ;
for(i=maxx ; i<maxx+m ; i=sig){
        while( x[i%m]-x[(i+1)%m]==0.0 && y[i%m]-y[(i+1)%m]==0.0 )
                i ++ ;
        sig = i+1 ;
        maxa = atan2( x[i%m] - x[(i+1)%m],
                                y[i%m] - y[(i+1)%m] ) ;
        for(j=2 ; j<c ; j++){
                ang = atan2( x[i%m] - x[(i+j)%m],
                                        y[i%m] - y[(i+j)%m] ) ;
                if( abs(ang-maxa) > 180 ){
                        if(ang > maxa)

ang -= 360 ;
                        else
                                ang += 360 ;
                }
                if( ang < maxa ){
                        maxa = ang ;
                        sig = i+j ;
                }

}
        angulos[k] = atan2(y[sig%m],x[sig%m]) ;
        if( angulos[k] < 0.0 )
                angulos[k] += DOSPI ;
        xx[k] = x[sig%m] ;
        yy[k] = y[sig%m] ;
        k ++ ;
} inc = DOSPI / (float)m ;
```

```
       n = k ;
       for(j=n-1, k=0, i=0, theta=0.0 ; i<m ; i++, theta+=inc) {
               while(!( (theta > (angulos[j] > angulos[k] ? angulos[j]-DOSPI :
                       angulos[j]) && theta <= angulos[k]) ||
                       (theta <= (angulos[j] > angulos[k] ? angulos[k]+DOSPI :
                       angulos[k]) &&
                       theta > angulos[j]) )) {
                               j = (j+1)%n ;
                               k = (k+1)%n ;
               }
               aj = angulos[j] ;
               ak = angulos[k] ;
               if( aj > ak ){
                       if( i < m/2 )
                               aj -= DOSPI ;
                       else
                               ak += DOSPI ;
               }
               if( fabs( theta - ak ) < inc/2 ){
                       x[i] = xx[k] ;
                       y[i] = yy[k] ;
               }
               else{
                       y1 = yy[j] ;
                       x1 = xx[j] ;
                       y2 = yy[k] ;
                       x2 = xx[k] ;

beta = tan( theta ) ;
                       if(x2 != x1){
                               t = (y2-y1) / (x2-x1) ;
                               x[i] = (y1 - t*x1) / (beta - t) + 0.5 ;
                               y[i] = beta * (y1 - t*x1) / (beta - t) + 0.5 ;
                       }
                       else{
                               x[i] = x1 ;
                               y[i] = beta * x1 ;
                       }
               }
       }
       for(i=0 ; i<m ; i++) {
               x[i] += cx ;
               y[i] += cy ;
       }
}
/***********************************************************/
```

I claim:

1. A device for measuring the edge characteristics of an eyeglass lens or the lens socket of an eyeglass frame, including:
   (a) a light source;
   (b) a flexible shadow generation surface situated such that a lens or frame to be measured is positioned optically between the light source and the shadow generation surface; and
   (c) an electro-mechanical imaging device for capturing analyzable images of a shadow of the edge of a lens or frame formed on the shadow generation surface.

2. A system for defining the outer perimeter of a lens, including:
   (a) a flexible membrane, having a first and second side, illuminated from the first side, wherein the lens is placed on the first side of the membrane;
   (b) a light sensitive transducer, positioned with respect to the membrane to receive light which strikes the first side of the membrane and passes through the membrane, for detecting the intensity level of points comprising an image of the second side of the membrane and generating a representation of the intensity levels of each point in the image, wherein the representation defines a spacial relationship between each point in the image; and
   (c) a central processing unit, coupled to the light sensitive transducer, for:
     (1) receiving the representation of the intensity levels of each point in the image; and
     (2) identifying a spacial relationship between points comprising a control edge of the lens by analyzing the intensity levels and the spacial relationship of each point in the image.

3. The system of claim 2, further including a light source for illuminating the first side of the membrane.

4. The system of claim 2, further including an analog to digital converter, coupled to the light sensitive transducer and the central processing unit, for digitizing the output of the light sensitive transducer and mapping the intensity level of each point in the image with a unique coordinate to identify the relative location of each such point, and providing a digital output to the central processing unit.

5. The system of claim 4, wherein the analog to digital converter is a frame grabber.

6. The system of claim 2, wherein the spacial relationship between the points comprising the control edge is stored for communication to another device.

7. The system of claim 2, wherein analyzing the intensity levels comprises calculating the partial first derivative of the intensity level of selected points in the image in a first direction.

8. The system of claim 7, wherein upon identifying an edge, analyzing the intensity levels further comprises:
   (a) calculation of the gradient of the intensity levels near the point at which the first derivative indicates the presence of an edge, to determine the direction of the edge; and
   (b) following the edge to determine whether the edge is the control edge.

9. The system of claim 8, wherein determining whether the edge is the control edge further comprises determining whether the edge is a generally convex curve.

10. The system of claim 2, further including:
   (a) a first polarizing filter, generally located such that light that strikes the first side of the membrane passes through the first polarizing filter; and
   (b) a second polarizing filter, generally located such that light passing through the membrane and received at the transducer, passes through the second polarizing filter after passing through the membrane.

11. The system of claim 2, further including at least one reflective surface located generally optically between the membrane and the transducer for redirecting the image of the second side of the membrane to be received by the transducer.

12. The system of claim 2, further including a field lens for preventing variations in the distance between the membrane and the transducer from distorting the image received by the transducer.

13. The system of claim 2, further including a lens for focusing the image received by the transducer.

14. The system of claim 2, further including a depth measurement gauge coupled to the CPU.

15. The system of claim 14, wherein the depth measurement gauge includes:
   (a) a shoulder having a generally flat surface; and
   (b) a generally thin retractable stylus having a distal end protruding from the shoulder and being calibrated to measure the distance the stylus retracts.

16. The system of claim 2, further including a foot pedal for indicating to the central processing unit that the most recently received representations of intensity levels are to be saved.

17. The system of claim 2, further including a display, coupled to the CPU for communicating information to a user.

18. The system of claim 17, wherein the display includes a touch screen for communicating information from the user to the CPU.

19. The system of claim 2, further including at least one output port for communicating with remote devices.

20. The system of claim 19, wherein at least one of the output ports is in accordance with EIA standard RS-232.

21. The system of claim 19, wherein at least one of the output ports is for communicating with remote devices coupled to an Ethernet communication network.

22. A method for determining the outer perimeter of a lens using a system comprising a light source, a flexible membrane having a first and a second side, an imaging device, and a CPU, including the steps of:
   (a) casting a shadow of the lens upon the flexible membrane;
   (b) detecting the intensity levels of points comprising an image of the membrane;
   (c) identifying relative position of points along the outer perimeter of a lens by analyzing the intensity levels and the relative positions of the points of the image.

23. The method of claim 22, wherein the shadow is cast upon a first side of the membrane, and the intensity level of the image is detected from the second side of the membrane.

24. A method for determining the outer perimeter of a lens using a system comprising a light source, a flexible membrane having a first and a second side, a transducer, and a CPU, including the steps of:
   (a) casting light upon a first side of an unobscured flexible membrane;

(b) detecting the intensity level of a second side of the unobscured membrane;

(c) digitizing the intensity level of a plurality of points on the second side of the membrane, the position of each point with respect to each other point being associated with the intensity level of that point;

(d) placing an eyeglass frame in contact with the first side of the flexible membrane, the lens sockets of the frame being generally coplanar with the first side of the membrane;

(e) digitizing the intensity level of a plurality of points on the second side of the membrane, the position of each point with respect to each other point being associated with the intensity level of that point;

(f) calculating a new object image comprising the absolute value of the intensity level of each point on the membrane, by subtracting the intensity value of each point on the unobstructed membrane from the intensity level of the same point after the eyeglass frame is placed in contact with the membrane; and (g) identifying the relative location of points around the inside perimeter of a lens socket of the eyeglass frame by analyzing the intensity levels and relative positions of points in the object image.

25. A method for determining the outer perimeter of a lens using a system comprising a light source, a flexible membrane having a first and a second side, a transducer, and a CPU, including the steps of:

(a) casting light upon a first side of an unobscured flexible membrane;

(b) detecting the intensity level of a second side of the unobscured flexible membrane;

(c) digitizing the intensity level of a plurality of points on the second side of the membrane, the position of each point with respect to each other point being associated with the intensity level of that point;

(d) placing a lens in contact with the first side of the flexible membrane, the plane of the lens being generally coplanar with the plane of the membrane;

(e) digitizing the intensity level of a plurality of points on the second side of the membrane, the position of each point with respect to each other point being associated with the intensity level of that point;

(f) calculating a new object image comprising the absolute value of the intensity level of each point on the membrane, by subtracting the intensity value of each point on the unobstructed membrane from the intensity level of the same point after the lens is placed in contact with the membrane;

(g) identifying the relative location of points around the outside perimeter of a lens by analyzing the intensity levels and relative positions of points in the object image.

* * * * *